Nov. 17, 1936.  W. H. VOGT  2,061,118
REGULATOR
Filed Aug. 23, 1935
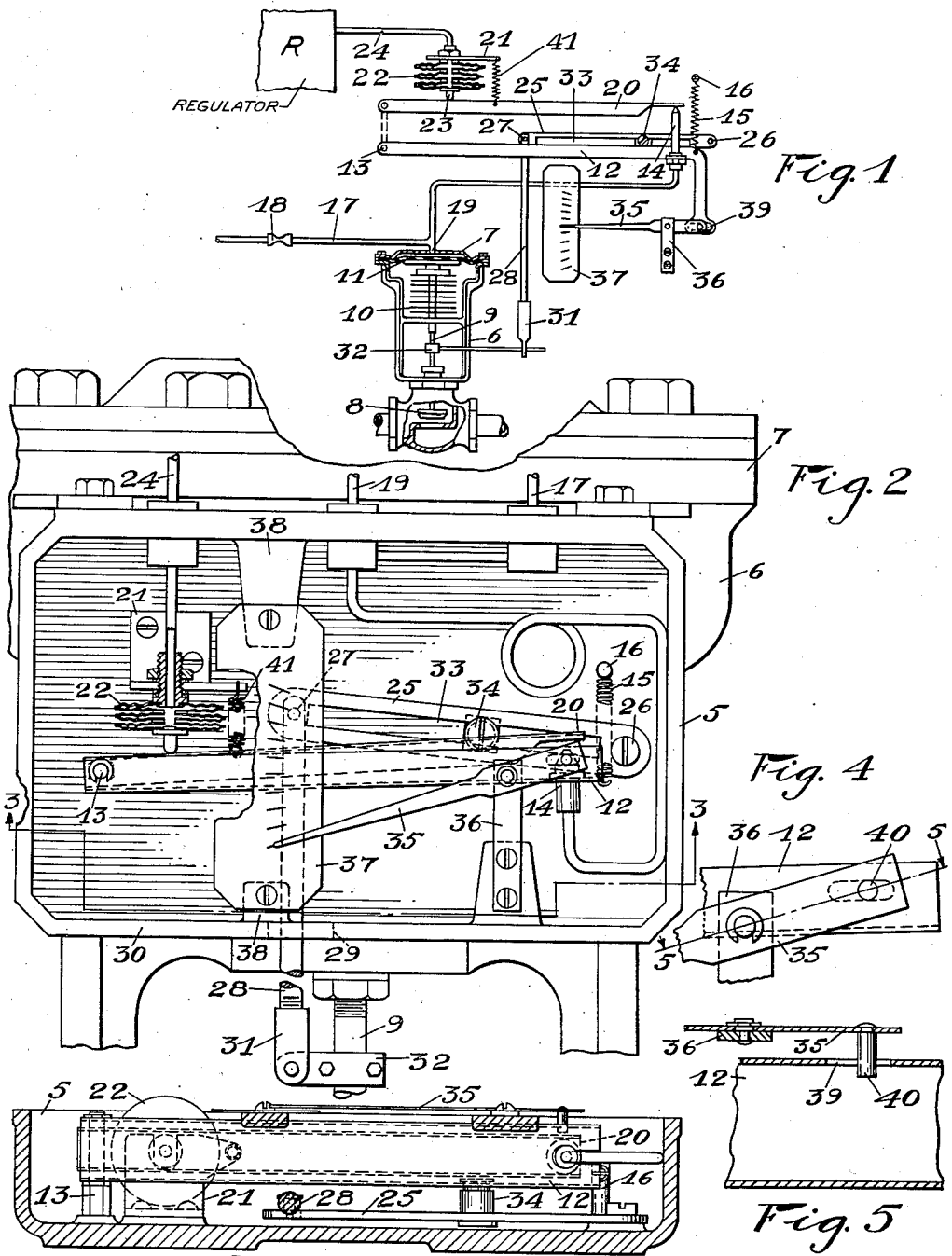
INVENTOR
William H. Vogt
BY D. Clyde Jones
ATTORNEY Patented Nov. 17, 1936

2,061,118

UNITED STATES PATENT OFFICE 2,061,118

REGULATOR

William H. Vogt, Rochester, N. Y., assignor to Taylor Instrument Companies, Rochester, N. Y., a corporation of New York Application August 23, 1935, Serial No. 37,528

12 Claims. (Cl. 137—139)

This invention relates to a regulating system and more particularly to a unit for accurately positioning the movable part of a valve or other regulating device used in such a system.

In the conventional type of regulating system, a regulator is employed to indicate the necessary adjustment of the valve disc of a valve or other movable element of a device for governing the application of a regulating medium. However, such systems have failed to afford the desired accuracy of regulation necessary in many installations due to the fact that the regulating valve or other regulating device did not move to the exact position indicated by the regulator. This inaccuracy of control has resulted from various causes such as hysteresis in the operation of certain parts, and friction, notably in the stuffing box about the valve stem of the regulating valve.

In order to obviate such inaccuracies of operation, it has been proposed to use a control unit with load compensating means and accurate valve position mechanism of the type disclosed in the copending application of Hubbard and Clarridge, Serial No. 696,650, filed November 4, 1933, but such a complete and expensive control unit is unnecessary in certain classes of applications where the conditions of regulation are less exacting.

The present invention has for its purpose a precision positioning unit for a valve disc or other regulating element, which is simple in construction and which can be readily applied to any type of valve or similar regulating device with a minimum amount of labor even when the valve or device is a part of a previously installed system.

The various features and advantages of the invention will appear from the detailed description and claims when taken with the drawing in which Fig. 1 is a diagrammatic showing of the precision unit of this invention in combination with a fluid pressure operated motor valve which it controls; Fig. 2 is a front view of the unit; Fig. 3 is a cross-sectional view thereof taken substantially on the line 3—3 of Fig. 2; Fig. 4 is a fragmentary view of a pointer and a portion of the actuating means therefor forming a part of the valve position indicator; and Fig. 5 is a cross-sectional view of the same taken on the line 5—5 of Fig. 4.

The unit of the present invention includes a case 5 herein illustrated as mounted on the frame 6 of a valve assembly 7. This valve is of the well-known type having a valve disc 8 carried by a valve stem 9 which is normally held in its uppermost position by a coil spring 10. A fluid pressure diaphragm motor 11 depresses the valve stem against the action of the spring 10. The mechanism within the case includes a channel-shaped nozzle lever 12 which is pivotally supported at one end on a pin 13 mounted on the rear wall of the case, while the other end of the lever carries an upwardly projecting nozzle 14. A tension spring 15 having its ends respectively connected to the free end of the nozzle lever and to an ear 16 on the case, tends to swing this lever and its nozzle upward. The nozzle has an aperture therein communicating with a source of compressed air through a capillary tube 17 having a constriction 18 therein, a branch 19 of this capillary tube communicating with the diaphragm motor top 11 of the valve. The pin 13 also serves as a pivot for a channel-shaped baffle lever 20 nested within the nozzle lever and having its free end movable in operative relation to the nozzle 14. Since the baffle lever and the nozzle lever are mounted in a common pivot, it is possible for the baffle to close the nozzle in all operating positions of the nozzle lever and thus it is possible to omit a relay valve which would otherwise be necessary.

The case also carries on its rear wall, a bracket 21 on which a metal bellows or tricapsular chamber 22 is mounted, the lower face of the bellows being provided with a stud 23 which projects downwardly into engagement with the baffle lever 20. This bellows communicates through a capillary tube 24, with a throttled source of compressed air which may be supplied under the control of a well-known type of regulator R, such as is disclosed in the patent to Hubbard #1,909,469, granted May 16, 1933. It will be noted that a coil spring 41 having its ends respectively connected to the bracket and to the baffle lever 20, tends to hold the baffle lever in engagement with the stud.

An auxiliary lever 25 has one end pivoted at 26 on the rear wall of the case at the side thereof opposite from pin 13, and has its other end pivotally connected at 27 to the upper end of a rod 28 which projects through an opening 29 in the lower flange 30 of the case. The lower end of this rod is screw-threaded for connection with a connecting piece 31 adapted to be engaged by a rigid arm 32 attached to and partaking of the motion of the valve stem 9. The auxiliary lever 25 has a lateral slot 33 along which a screw 34 is adjustable so that the nozzle lever can be made to move the same distance for equal percentages of valve stem travel irrespective of the total valve stem travel. By this arrangement as the distance between the pivot 27 and the screw 34 is increased, that is, as the effective leverage of the auxiliary lever on the baffle lever is increased, the distance between the screw 34 and the pin 13 is increased so that a smaller movement of the valve stem is necessary to cause an equal movement of the nozzle lever. The movement of the screw 34 toward the pivot 27 effects these results in the opposite sense. It should be noted that the head of this screw projects into engagement with a portion of the nozzle lever, so that the movement of the valve stem causes a corresponding movement of the nozzle with respect to the baffle lever.

In order to show the position of the valve disc 8, a valve position indicator is provided. This indicator includes a pointer 35 which is pivotally mounted on a support 36 carried by the case and also includes a graduated scale 37 mounted on studs 38 on the case, in a position for the pointer to swing over its graduations. This scale is preferably calibrated directly in percentage of valve opening. The pointer at the end thereof which is remote from the scale, is provided with a pin 40 which engages an elongated slot 39 in the side of the nozzle lever 12.

In operation, a throttled supply of compressed air controlled by any well-known type of regulating instrument is applied through the capillary tube to the tricapsular chamber. It will be understood that compressed air of uniform pressure is supplied through the constriction 18 in the capillary tube 17, to the diaphragm motor 11 and nozzle 14, through the orifice of which the air slowly leaks away, the amount of which leakage is determined by the position of the baffle lever 20 with respect to this nozzle. If it be assumed that the pressure of the compressed air supplied to the tricapsular chamber 22 increases, the chamber expands and its lug 23 moves the baffle lever 20 downward. Since the baffle lever is forced downward, the space between the baffle and the nozzle diminishes and therefore the leakage of air through the orifice of the nozzle decreases. With this decreased leakage of compressed air, the pressure in the branch capillary tube 19 leading to the diaphragm or motor top 11 of the valve increases with the result that the diaphragm depresses the valve stem 9. As the valve stem is thus lowered, the arm 32 connected thereto lowers the rod 28 which, in turn, lowers the left end of the auxiliary lever 25 connected thereto. When the auxiliary lever thus swings downward, the head of the adjustable screw 34 forces the nozzle lever 12 against the action of coil spring 15. In this way the nozzle 14 is moved downward an amount proportional to the original movement of the baffle.

In order to bring about this necessary movement of the valve stem 9, the gap or space between the baffle 20 and the nozzle 14 has been decreased slightly. This gap must remain permanently decreased as long as the valve disc 8 stays away from the necessary regulating position. Thus compressed air will be supplied at increased pressure to the diaphragm motor of the valve through branch capillary tube 19 until the valve disc is adjusted to the proper position for accurate regulation.

Conversely, when the tricapsular chamber contracts as a result of the reduction of pressure therein, the baffle lever 20 moves upward under the action of the coil spring 41. This movement of the baffle upwardly increases the space between it and the nozzle 14, thereby allowing the air pressure in the diaphragm or motor top 11 to be reduced by leakage through the nozzle 14. This leakage continues until the normal spacing between the nozzle and baffle is restored which is effected by the movement of the valve stem, being caused by the coil spring 10. The movement of the valve stem, in turn, actuates its arm 32 to position the rod 28 and this rod, in turn, swings the left end of the auxiliary lever 25 downward until the head of the adjusting screw 34 carried thereby moves the baffle lever to its desired position.

In many applications of the unit in a regulating system, it is desirable to indicate at all times the percentage of valve opening. In the present arrangement this is effected by the valve position indicator including the pointer 35 and the graduated scale 37. It will be recalled that the pointer is provided with a pin 40 which engages an elongated slot 39 in the right-hand end of the baffle lever. Thus, as the nozzle lever 12 is moved upward or downward as a result of the movement of the valve stem, the pointer is correspondingly moved over the graduated scale plate to indicate the position of the valve disc 8, that is, the valve opening.

I claim:

1. In an element positioning unit, a baffle lever and a nozzle lever, both movable about a common axis, said nozzle lever having mounted thereon a nozzle in operative relation to said baffle lever, means for effecting relative movement between said baffle lever and said nozzle in response to a variation in a condition, a regulating element, pneumatic means controlled by said nozzle and baffle lever for moving said element, and means including a link connected to said element for effecting relative movement between said nozzle lever and said baffle lever.

2. In an element positioning unit, a baffle lever and a nozzle lever, both movable about a common axis, said nozzle lever having mounted thereon a nozzle in operative relation to said baffle lever, means for effecting relative movement between said baffle lever and said nozzle in response to a variation in a condition, a regulating element, pneumatic means controlled by said nozzle and baffle lever for moving said element, means including a link connected to said element for effecting relative movement between said nozzle lever and said baffle lever, a fixed scale, a pointer movable over said scale, and means carried by said nozzle lever for swinging said pointer.

3. In an element positioning unit, a baffle lever and a nozzle lever, both movable about a common axis, an apertured nozzle mounted on said nozzle lever with its aperture in operative relation to said baffle lever, means for effecting relative movement between said baffle lever and said nozzle lever in response to a variation in a condition, a regulating element, a pressure fluid motor for operating said element, a capillary tube connected to a source of pressure fluid and communicating through a restriction with said aperture and with said motor, and means including a member connected to said element and actuated thereby for effecting relative movement between said nozzle lever and said baffle lever.

4. In an element positioning unit, a baffle lever and a nozzle lever, both movable about a common axis, an apertured nozzle mounted on said nozzle lever with its aperture in operative relation to said baffle, means for effecting relative movement between said baffle lever and said nozzle lever, a regulating element, a pressure fluid motor for operating said element, a capillary tube connected to a source of pressure fluid and communicating through a restriction with said aperture and with said motor, an auxiliary lever pivoted adjacent a free end of said baffle lever, a projection on said auxiliary lever movable into engagement with said nozzle lever, said projection being adjustable along said auxiliary lever, and means including a link connecting said regulating element and said auxiliary lever.

5. In an element positioning unit, a baffle lever and a nozzle lever, both movable about a common axis, an apertured nozzle mounted on said nozzle lever with its aperture in operative relation to said baffle, means for effecting relative movement between said baffle lever and said nozzle lever in response to a variation in a condition, a regulating element, a pressure fluid motor for operating said element, a capillary tube connected to a source of pressure fluid and communicating through a restriction with said aperture and with said motor, an auxiliary lever pivoted adjacent a free end of said nozzle lever, a projection on said auxiliary lever movable into engagement with said nozzle lever, said projection being adjustable along said auxiliary lever, a regulating element and means including a link connecting said regulating element and said auxiliary lever, a fixed scale, a pivoted pointer having its free end extending in the general direction of said common axis, and means actuated by said nozzle lever for swinging said pointer over said scale.

6. In combination with a valve assembly including a valve body, a valve stem carrying a valve disc movable in said body, a pressure fluid motor for operating said valve stem, a valve disc positioning unit mounted on said frame, said unit including a baffle lever and a nozzle lever, both levers being movable about a common axis, an apertured nozzle mounted on said nozzle lever with its aperture in operative relation to said baffle lever, means for effecting relative movement between said levers, a capillary tube connectible to a source of pressure fluid and communicating through a restriction with said aperture and with said motor, and other means including a member carried by said valve stem for effecting relative movement between said nozzle lever and said baffle lever.

7. In combination with a valve assembly including a valve body, a valve stem carrying a valve disc movable in said body, a pressure fluid motor for operating said valve stem, a valve disc positioning unit mounted on said frame, said unit including a baffle lever and a nozzle lever, both levers being movable about a common axis, an apertured nozzle mounted on said nozzle lever with its aperture in operative relation to said baffle lever, means for effecting relative movement between said levers, a capillary tube connected to a source of pressure fluid and communicating through a restriction with said aperture and with said motor, other means including a member actuated by said valve stem for effecting relative movement between said nozzle lever and said baffle lever, a fixed scale, and a pivoted pointer movable with respect to said scale and actuated by said nozzle lever.

8. In an element positioning unit, a nozzle and a baffle movable relative to each other from a position wherein the baffle opens the nozzle to a position in which the baffle substantially closes the nozzle, means for effecting relative movement between said nozzle and said baffle in response to a variation in a condition, a regulating element, pneumatic means controlled by said nozzle and said baffle for moving said element, and means including a member connected to said element for effecting relative movement between said baffle and said nozzle, an amount adjustable but proportional to a given movement of said element.

9. In an element positioning unit, a valve comprising two parts movable relative to each other from a position wherein said valve is open to a position in which said valve is substantially closed, means for effecting relative movement between said parts in response to a variation in a condition, a regulating element, pneumatic means controlled by said valve for adjusting said element, and means including a member actuated by said element for effecting relative movement between said valve parts, an amount adjustable but proportional to any given movement of said element.

10. In an element positioning unit, a valve comprising two members movable relative to each other from a position wherein said valve is open to a position in which said valve is substantially closed, means for effecting relative movement between said members in response to a change in a condition, a pivoted arm for effecting additional movement between said members, a regulating element to be positioned, pneumatic means controlled by said valve for moving said element, a second pivoted arm actuated in response to the movement of said element, and a fulcrum member carried by and adjustable lengthwise of one of said arms to contact the other arm, whereby said first arm is moved by a given movement of said second arm a proportional amount, adjustable at will within determined limits.

11. In an element positioning unit, a valve comprising two members movable relative to each other from a position wherein said valve is open to a position in which said valve is substantially closed, means for effecting relative movement between said members in response to a change in a condition, a pivoted arm for effecting additional movement between said members, a regulating element to be positioned, pneumatic means controlled by said valve for moving said element, a second pivoted arm movable in a plane parallel to the plane of movement of said first arm, said second arm being actuated in response to the movement of said element, and a fulcrum member carried by and adjustable lengthwise of one of said arms to contact the other arm, whereby said first arm is moved by a given movement of said second arm a proportional amount, adjustable at will within determined limits.

12. In an element positioning unit, a valve comprising two members movable relative to each other from a position wherein said valve is open to a position in which said valve is substantially closed, means for effecting relative movement between said members in response to a change in a condition, a pivoted arm for effecting additional movement between said members, a regulating element to be positioned, pneumatic means controlled by said valve for moving said element, a second pivoted arm actuated in response to the movement of said element, said arms being movable in generally parallel planes and being pivoted at opposite ends with respect to each other, and a fulcrum member carried by and adjustable lengthwise of one of said arms to contact the other arm, whereby said first arm is moved by a given movement of said second arm an amount adjustable at will within determined limits.

WILLIAM H. VOGT.